United States Patent [19]

Hayes

[11] Patent Number: 5,178,650
[45] Date of Patent: Jan. 12, 1993

[54] POLYIMIDE GAS SEPARATION MEMBRANES AND PROCESS OF USING SAME

[75] Inventor: Richard A. Hayes, Parkersburg, W. Va.

[73] Assignees: E. I. Du Pont de Nemours and Company, Wilmington, Del.; L'Air Liquide, SA, Paris, France

[21] Appl. No.: 820,022

[22] Filed: Jan. 13, 1992

Related U.S. Application Data

[63] Continuation of Ser. No. 620,256, Nov. 30, 1990, abandoned.

[51] Int. Cl.$^5$ ............... B01D 53/22; B01D 71/64
[52] U.S. Cl. ............... 55/16; 55/68; 55/158
[58] Field of Search ............... 55/16, 68, 158; 210/500, 39

[56] References Cited

U.S. PATENT DOCUMENTS

| | | | |
|---|---|---|---|
| Re. 30,351 | 7/1980 | Hoehn et al. | 55/158 X |
| 3,822,202 | 7/1974 | Hoehn | 55/158 X |
| 3,899,309 | 8/1975 | Hoehn et al. | 55/158 X |
| 4,156,597 | 5/1979 | Browall | 55/16 |
| 4,378,400 | 3/1983 | Makino et al. | 55/16 X |
| 4,474,662 | 10/1984 | Makino et al. | 55/158 X |
| 4,512,893 | 4/1985 | Makino et al. | 55/158 X |
| 4,528,004 | 7/1985 | Makino et al. | 55/16 X |
| 4,690,873 | 9/1987 | Makino et al. | 55/16 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,838,900 | 6/1989 | Hayes | 55/16 |
| 4,880,442 | 11/1989 | Hayes | 55/16 |
| 4,897,092 | 1/1990 | Burgoyne, Jr. et al. | 55/16 |
| 4,932,982 | 6/1990 | Hayes | 55/16 |
| 4,932,983 | 6/1990 | Hayes | 55/16 |
| 4,948,400 | 8/1990 | Yamada et al. | 55/16 X |
| 4,952,220 | 8/1990 | Langsam et al. | 55/16 X |
| 4,959,151 | 9/1990 | Nakatani et al. | 55/16 X |
| 4,981,497 | 1/1991 | Hayes | 55/16 |
| 4,983,191 | 1/1991 | Ekiner et al. | 55/16 X |
| 4,988,371 | 1/1991 | Jeanes et al. | 55/16 |
| 4,997,462 | 3/1991 | Nakatani et al. | 55/158 X |

FOREIGN PATENT DOCUMENTS

| | | |
|---|---|---|
| 0349008 | 6/1989 | European Pat. Off. . |
| 0361377 | 4/1990 | European Pat. Off. . |
| 0370509 | 5/1990 | European Pat. Off. . |
| 58-008512 | 1/1983 | Japan ............... 55/158 |
| 59-225705 | 12/1984 | Japan ............... 55/158 |
| 60-082103 | 5/1985 | Japan ............... 55/158 |
| 63-028424 | 2/1988 | Japan ............... 55/158 |
| 63-166415 | 7/1988 | Japan ............... 55/158 |
| 63-236517 | 10/1988 | Japan ............... 55/16 |
| 63-264121 | 11/1988 | Japan ............... 55/158 |
| 63-267415 | 11/1988 | Japan ............... 55/16 |
| 01-194905 | 8/1989 | Japan ............... 55/158 |
| 01-245830 | 10/1989 | Japan ............... 55/158 |
| 01-249122 | 10/1989 | Japan ............... 55/158 |
| 02-222716 | 9/1990 | Japan . |
| 02-222717 | 9/1990 | Japan . |
| 2229180A | 9/1990 | United Kingdom . |

OTHER PUBLICATIONS

Stern et al., Structure/Permeability Relationships of Polyimide Membranes, Applications to the Separation of Gas Mixtures; Journal of Polymer Science; Part B: Polymer Physics, vol. 27, pp. 1887–1909.

Primary Examiner—Robert Spitzer

[57] ABSTRACT

Novel aromatic polyimide gas separation membranes and the process of using such membranes to separate one or more gases from a gaseous mixture is disclosed. The polyimides are derived from a variety of aromatic tetracarboxylic dianhydrides used to form aromatic polyimide gas separation membranes and diamines of the formula

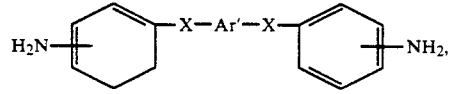

where —X— is a divalent radical such as —O— or

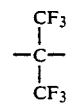

and —Ar'— is a divalent radical such as phenylene, napthalene, biphenyl or

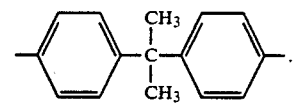

12 Claims, No Drawings

POLYIMIDE GAS SEPARATION MEMBRANES AND PROCESS OF USING SAME

This is a continuation of application Ser. No. 07/620,256 filed Nov. 30, 1990, now abandoned.

FIELD OF THE INVENTION

The present invention relates to aromatic polyimide gas separation membranes and the process for separating one or more gases from a gaseous mixture using such membranes. The polyimides are derived from a variety of aromatic tetracarboxylic dianhydrides, including some conventionally used to form gas separation membranes and certain diamines in which the amino groups are attached to benzene rings which in turn are bridged by benzene rings.

PRIOR ART

U.S. Pat. No. Re. 30,351, U.S. Pat. No. 3,822,202, and U.S. Pat. No. 3,899,309 disclose gas separation membrane materials comprising certain semi-rigid aromatic polyimides, polyamides, and polyesters.

U.S. Pat. No. 4,156,597 discloses a gas separation membrane consisting of an ultrathin, dense polyetherimide membrane.

U.S. Pat. No. 4,240,914, U.S. Pat. No. 4,358,378, U.S. Pat. No. 4,385,084, and U.S. Pat. No. 4,410,568 disclose an asymmetric polyimide gas separation membrane prepared from an aliphatic polyimide material.

U.S. Pat. No. 4,307,135 discloses the preparation of an asymmetric polyimide membrane from a soluble polyimide.

U.S. Pat. No. 4,378,324, U.S. Pat. No. 4,460,526, U.S. Pat. No. 4,474,662, U.S. Pat. No. 4,485,056 and U.S. Pat. No. 4,512,893 disclose a process for preparing asymmetric polyimide membranes.

U.S. Pat. No. 4,378,400 discloses polyimide gas separation materials which incorporate 3,3',4,4',-biphenyltetracarboxylic dianhydride residues.

U.S. Pat. No. 4,673,418 discloses the preparation of asymmetric polyetherimide gas separation membranes from solutions of said polymer in volatile solvent-less volatile swelling agent mixtures.

U.S. Pat. No. 4,705,540 discloses aromatic polyimide gas separation membrane materials based on rigid polyimides.

For example, U.S. Pat. No. 3,563,951 describes polyimide materials prepared from the diamine shown below:

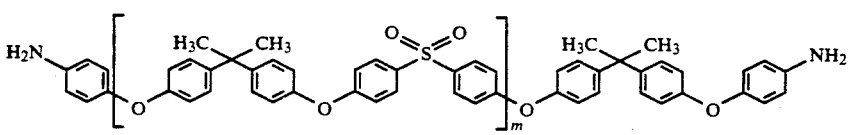

U.S. Pat. No. 4,111,906, U.S. Pat. No. 4,203,922, U.S. Pat. No. 4,735,492, U.S. Pat. No. 4,477,648 and U.S. Pat. No. 4,535,101 describe polyimide materials with diamines which incorporate a bisphenol-AF residue, e.g.;

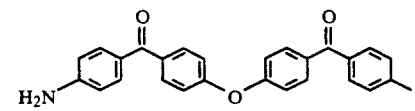

Polyimide materials which incorporate certain bis-(aminobenzoyl)diphenyl ether units, shown below, are described in U.S. Pat. No. 4,405,770;

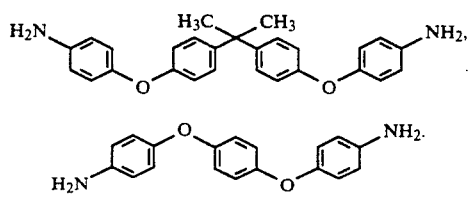

U.S. Pat. No. 4,485,140, U.S. Pat. No. 4,696,994, U.S. Pat. No. 4,725,642, and U.S. Pat. No. 4,758,875 teach the incorporation of diamines, shown below, into polyimide materials;

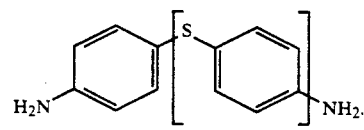

Crystalline polyimide materials containing cumulative phenylene sulfide units, shown below, are described in U.S. Pat. No. 4,716,216;

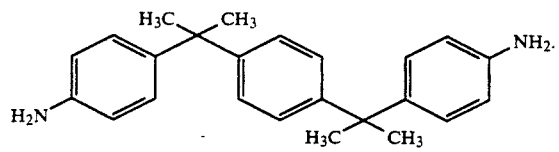

Polyetherimide compositions which incorporate bisaniline-P, shown below, are taught in U.S. Pat. No. 4,774,317;

SUMMARY OF THE INVENTION

The present invention relates to certain polyimide separation membranes particularly useful for separating gases and the process for using them. This class of polyimide membrane materials compositionally contain diamine residues which incorporate greater than two aromatic units in the polymer chain. Membranes formed from this class of polyimide materials have improved environmental stability and superior gas productivity.

The high selectivities of some gases from multicomponent mixtures is due to the molecular free volume in the polymer. These diamines have the amino groups attached to benzene nuclei which in turn are bridged to at least one aromatic nucleus by any of various divalent radicals.

DETAILED DESCRIPTION

The present invention relates to the discovery that gas separation membranes exhibiting exceptional gas productivity can be obtained by forming such gas separation membranes from aromatic polyimides which incorporate diamine residues derived from diamines of the following structural formula $H_2N-Ar-NH_2$ where —Ar— is

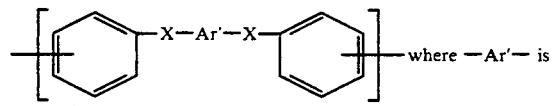

where —Ar'— is

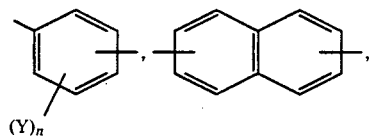

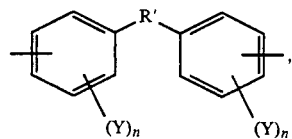

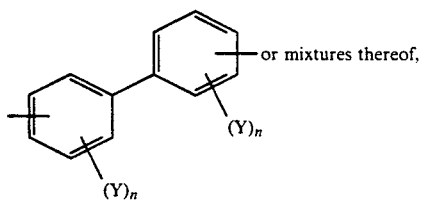

or mixtures thereof,

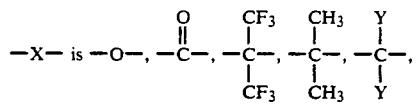

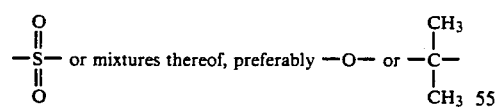

—S— or mixtures thereof, preferably —O— or $-\underset{CH_3}{\overset{CH_3}{C}}-$ —Y is independently —H, alkyl groups having 1 to 6 carbon atoms, aromatic groups having 6 to 12 carbon atoms, or a halogen such as —F, —Cl, —Br, or —I, preferably —H or phenyl, provided that at least one —Y cannot be —H. n is an integer from 1 to 4 and

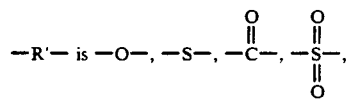

-continued

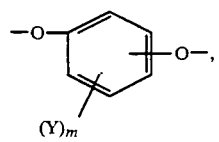

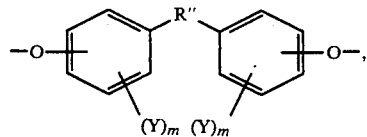

or mixtures thereof where R" —X— or

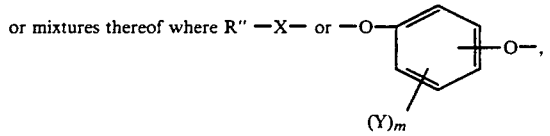

or mixtures thereof and m is and integer from 0–4.

Gas separation membranes prepared from at least 50% by weight of such materials possess an excellent balance of gas permeation rates and selectivities of one gas over other gases in a multicomponent gas mixture. The high gas productivity of these membranes is believed to be due to optimization of the molecular free volume in the polymer structure resulting from the incorporation of said diamine-residues in the polyimide chain.

Generally, an inverse relationship between the gas permeation rate (flux) and the selectivity of said gas over other gases in a multicomponent gas mixture has been exhibited within polymer classes, such as polyimides. Because of this, prior art polyimide gas separation membranes tend to exhibit either high gas permeation rates at the sacrifice of high gas selectivities or high gas selectivities at the sacrifice of high permeation rates. It would be highly desirable for polyimide gas separation materials to exhibit high gas selectivities while maintaining high gas permeation rates.

The present invention circumvents the above shortcomings and provides exceptionally high selectivity polyimide gas separation membrane materials while maintaining good gas permeation rates. Polyimide materials useful in the present invention contain the repeating unit:

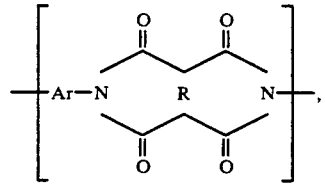

where —Ar— has the meaning defined above, where

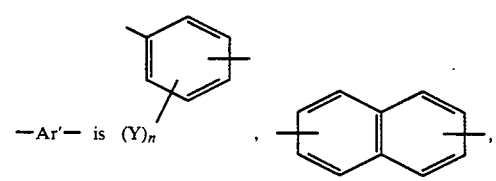

—Ar'— is

-continued

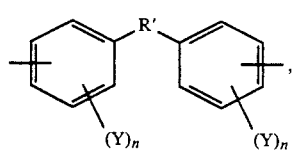

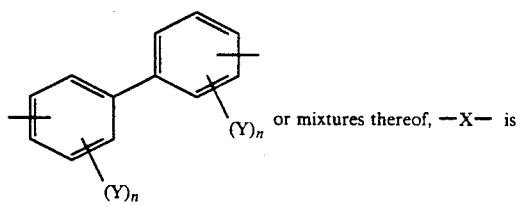

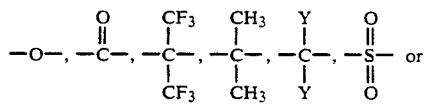

mixtures thereof, 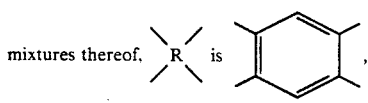

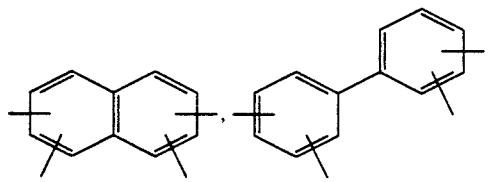

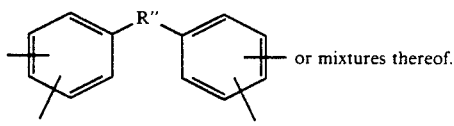

—Y is independently —H, alkyl groups having 1 to 6 carbon atoms, aromatic groups having 6 to 12 carbon atoms, or a halogen such as —F, —Cl, —Br, or —I, provided that at least one —Y cannot be —H. n is an integer from 1 to 4 and —R′—, is

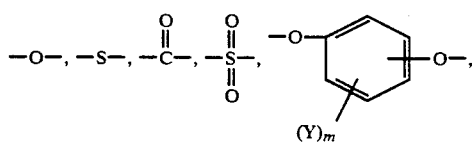

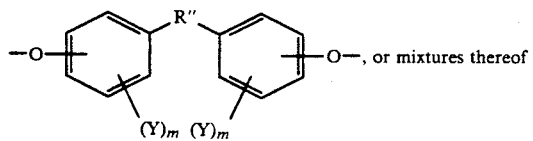

where R″ is 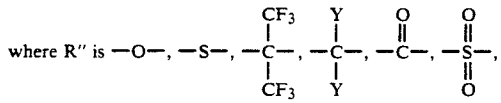

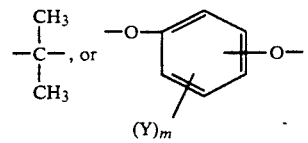

or mixtures thereof, and m is an integer from 0–4.

The preferred polyimide compositions of the present invention are soluble in a wide range of ordinary organic solvents. This is a great advantage for the ease of fabrication of industrially useful gas separation membranes. These soluble polyimides can be solution cast on porous solvent resistant substrates to serve as the dense separating layer of the composite membrane. Alternatively, they can be solution cast as dense or asymmetric membranes. Insoluble polyimide compositions may be formed into gas separation membranes from their corresponding polyamic acid precursors followed by conversion to the polyimide.

Gas separation membranes prepared from the polyimide materials of the present invention possess an excellent balance of gas permeation rates and selectivities for one gas over other gases in a multicomponent gas mixture. Generally, prior polyimide gas separation materials exhibit an inverse relationship between the gas permeation rate and the selectivity of said gas over other gases in a multicomponent gas mixture. For example, U.S. Pat. No. 4,705,540 and U.S. Pat. No. 4,717,394 teach that certain alkyl-substituted polyimide material membranes have ultrahigh gas permeation rates, but suffer from only moderate gas selectivities. The polyimide materials of the present invention have been found to exhibit a much greater selectivity of oxygen from nitrogen in air separations than is disclosed therein. The polyimide materials taught in U.S. Pat. No. Re. 30,351, U.S. Pat. No. 3,822,202 and U.S. Pat. No. 3,899,309 also suffer from moderate gas selectivities. This is demonstrated by the herein incorporated Comparative Example; which is typical of the polyimide membrane materials disclosed therein. Further, U.S. Pat. No. Re. 30,351, U.S. Pat. No. 3,822,202, and U.S. Pat. No. 3,899,309 neither disclose, teach nor contemplate the use of diamines with greater than two aromatic units in their main chain or the surprisingly greater gas selectivities found for polyimide material membranes found herein. The preferred materials of the present invention (Example 1) have been found to have a greater oxygen/nitrogen selectivity than disclosed for the polyetherimide gas separation membrane materials disclosed in U.S. Pat. No. 4,156,597 while maintaining greater than twice the oxygen permeation rate. The polyimide gas separation membrane materials disclosed in U.S. Pat. No. 4,378,400 suffer from low oxygen permeation rates. The polyimide membrane materials of the present invention have been found to have from 44 to 3 times the oxygen permeation rate than found for the polyimide materials disclosed in U.S. Pat. No. 4,378,400. It is believed that the incorporation of the diamine units described before into the backbone of thepolyimide membrane materials.of the present invention allows for the optimization of the molecular free volume within membranes of the present invention. This optimization is responsible for the surprisingly high gas selectivities observed for the present materials while maintaining good gas permeation rates.

The polyimides described in this invention have high inherent thermal stabilities. They are generally stable up to 400° C. in air or inert atmospheres. The glass transition temperatures of these polyimides are generally above 250° C. The high temperature characteristics of these polyimides can help to prevent the membrane compaction problems observed in other polymers at even moderate temperatures.

The polyimide membranes disclosed herein have found use in gas separations. The present invention finds use in the enrichment of oxygen and nitrogen from air for increased combustion or inerting systems, respectively; in recovery of hydrogen in refinery and ammonia plants; separation of carbon monoxide from hydrogen in syngas systems; and separation of carbon dioxide or hydrogen sulfide from hydrocarbons.

EXAMPLES

EXAMPLE 1

To a stirred solution of 1,4-bis(4-aminophenoxy)benzene,

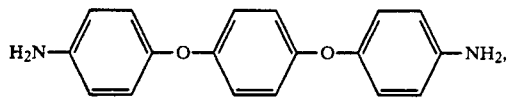

(116.8 g, 0.4 mol) in N-methylpyrrolidone (1000 ml) was added 5,5,[2,2,2-trifluoro-1-(trifluoromethyl)ethylidene]-bis-1,3-isobenzofurandione,

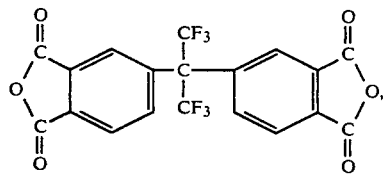

(179.3 g, 0.404 mol) under an inert atmosphere at room temperature. The gold-colored reaction solution became very viscous and was allowed to stir overnight at room temperature. A solution of acetic anhydride (163.34 g, 1.6 mol) and triethylamine (161.90 g, 1.6 mol) was added with rapid stirring at room temperature. After mixing over the weekend at room temperature, the very viscous reaction solution was diluted with additional N-methylpyrrolidone and precipitated in water. The resulting solid was collected and washed three times with water, washed twice with methanol and allowed to air dry overnight. The solid was further dried in a vacuum oven at 20 inches (0.51 m) mercury and 130° C. for 5 hours and at 240° C. for 3 hours to yield 278.06 g product.

The polymer prepared above was found to be soluble in dimethyl-sulfoxide, meta-cresol, N,N-dimethylacetamide and N-methylpyrrolidone.

Films of the polymer prepared above were cast from a 15% polymer solution (based on weight) in N-methylpyrrolidone onto a glass plate treated with Du Pont TEFLON® dry lubricant at 100° C.±2° C. with a 15-mil (38.4×10-5 m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

Du Pont TEFLON® dry lubricant contains a fluorocarbon telomer which reduces the adhesion of the membrane to the glass plate.

A film, prepared as above which was 1.15 mils (2.92×10-5 m) thick, was tested for mixed gas oxygen/nitrogen (21/79, mole) permeabilities at 104.7 psig (722 kPag), 23.4° C. The results are reported below:

| $O_2$ Productivity: | 430 centiBarrers |
|---|---|
| $O_2/N_2$ Selectivity: | 6.0 |

A centiBarrer is the number of cubic centimeters of gas passed by the membrane at standard temperature and pressure times the thickness of the membrane in centimeters times $10^{-12}$ divided by the permeating area of the membrane in square centimeters times the time in seconds times partial pressure difference across the membrane in centimeters mercury (cm Hg), i.e., $$\text{centiBarrer} = 10^{-12} \frac{cm^3 \, (STP) cm}{cm^2 \, \text{sec cm Hg}}$$

COMPARATIVE EXAMPLE

To a stirred solution of 1,5-naphthalene diamine (31.6 g, 0.2 mol) in N,N,-dimethylacetamide (400 ml) was portion wise added 5,5,[2,2,2-trifluoro-1-(trifluoromethyl)ethylidene]bis-1,3-isobenzofurandione (88.9 g, 0.2 mol) under an inert atmosphere at room temperature. The reaction solution was heated to 67° C. and stirred for one hour. A solution of acetic anhydride (82 g) and tri-ethylamine (82 g) was added to the rapidly stirring reaction solution. After stirring 2 hours at room temperature, the viscous reaction solution was precipitated in methanol. The resulting off-white solid was collected and dried in a vacuum oven at 20 inches (0.51 m) mercury and 150° C. for one hour and for 4 hours at 220° C.

Films of the above polyimide were cast from a 15% polymer solution (based on weight) in N-methylpyrrolidone onto a glass plate treated with Du Pont TEFLON® dry lubricant at 60° C. with a 15 mil (38×10-5 m) knife gap. The films were dried on the plate at 60° C., cooled to room temperature and stripped off the plate. The films were further dried in a oven at 20 inches (0.51 m) mercury and room temperature overnight, at 110° C. for 3 hours and at 220° C. for 4 hours.

The films prepared above were tested for mixed gas $O_2/N_2$-(21/79, mole) permeabilities at 300 psig (20.7×10-5 Pa), 25° C. The results are reported below:

| $O_2$ Permeability: | 560 centiBarrers |
|---|---|
| $O_2/N_2$ Selectivity: | 4.8 |

Example 2

A stirred solution of 4,4,[1,4-phenylenebis(1-methylethylidene]bis-aniline,

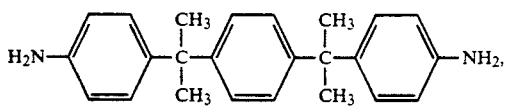

(68.8 g, 0.20 mol), and 5,5,[2,2,2-trifluoro-1-(trifluoromethyl)ethylidene]-1,3-isobenzofurandione (97.2 g, 0.2025 mol) in N-methylpyrrolidone (900 ml) was slowly heated to reflux under an inert atmosphere while collecting distillates. After heating at reflux for 4 hours, a total of 346 ml distillates had been collected. The viscous reaction solution was cooled to room temperature, diluted with N-methylpyrrolidone, and precipitated in water. The resulting solid was collected and washed twice with methanol. After air-drying overnight, the solid was dried in a vacuum oven at 20 inches (0.51 m) mercury and 120° C. for 3 hours and at 210° C. for 4 hours to yield 139.2 g product.

Films of the polymer prepared above were cast from a 15% polymer solution (based on weight) in N-methylpyrrolidone onto a glass plate treated with Du Pont TEFLON® dry lubricant at 100° C.±2° C. with a 15-mil (38.4×10-5 m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 2.1 mils (5.3×10-5 m) thick, was tested for mixed gas oxygen/nitrogen (21/79, mole) permeabilities at 483.3 psig (3332 kPag), 29.4° C. The results are reported below:

| $O_2$ Productivity: | 360 centiBarrers |
|---|---|
| $O_2/N_2$ Selectivity: | 4.6 |

Example 3

To a stirred solution of 4,4'-bis(4-aminophenoxy)-biphenyl,

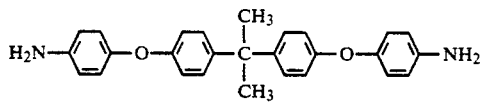

(25.0 g, 0.068 mol) in N-methylpyrrolidone (200 ml) was added 5,5,[2,2,2-trifluoro-1-(trifluoromethyl)-ethylidene]1,3-isobenzofurandione (30.45 g, 0.069 mol) under an inert atmosphere at room temperature. The reaction become very viscous and additional N-methylpyrrolidone (200 ml) was added. After stirring overnight at room temperature, a solution of acetic anhydride (27.70 g, 0.27 mol) and triethylamine (27.4 g, 0.27 mol) was added with rapid stirring at room temperature. After stirring at room temperature for 2.5 hours, the reaction solution was diluted with additional N-methylpyrrolidone and precipitated in water. The resulting solid was collected and washed three times with water, washed twice with methanol and allowed to air dry overnight. The solid was further dried in a vacuum oven at 20 inches (0.51 m) mercury and 120° C. for 5 hours and at 250° C. for 3 hours to yield 40.8 g product.

The polymer prepared above was found to be soluble in dichloromethane, m-cresol, dimethylsulfoxide, N,N-dimethylacetamide and N-methylpyrrolidone.

Films of the polymer prepared above were cast from a 15% polymer solution (based on weight) in N-methylpyrrolidone onto a glass plate treated with Du Pont TEFLON® dry lubricant at 100° C.±2° C. with a. 15-mil (38.4×10-5 m) knife gap. After drying on the plate at 100° C.±2° C. for 0.5 hours, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.35 mils (3.43×10-5 m) thick, was tested for mixed gas oxygen/nitrogen (21/79, mole) permeabilities at 496 psig (3420 kPag), 23.0° C. The results are reported below:

| $O_2$ Productivity: | 210 centiBarrers |
|---|---|
| $O_2/N_2$ Selectivity | 5.4 |

Example 4

To a stirred solution of 2,5-bis(4-aminophenoxy)-biphenyl,

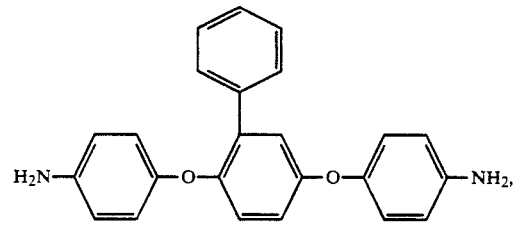

(149.10 g, 0.40 mol) in N-methylpyrrolidone (1200 ml) was added 5,5'-[2,2,2-trifluoro-1-(trifluoromethyl)ethylidene]-1,3-isobenzofurandione (179.38 g, 0.404 mol) under an inert atmosphere at room temperature. The very viscous reaction solution was stirred at room temperature for 4 hours and then a solution of acetic anhydride (163.36 g, 1.60 mol) and triethylamine (161.92 g, 1.60 mol) was added with rapid stirring at room temperature. After stirring overnight at room temperature, the reaction solution was diluted with additional N-methylpyrrolidone and precipitated in water. The resulting solid was collected and washed twice with water, washed twice with methanol and allowed to air dry overnight. The solid was further dried in a vacuum oven at 20 inches (0.51 m) mercury and 125° C. for 4 hours and at 250° C. for 4 hours.

The polymer prepared above was found to be soluble in dichloromethane, dimethylsulfoxide, N,N-dimethylacetamide and N-methylpyrrolidone.

Differential Scanning Calorimetry (DSC) was performed on the above polymer using a Du Pont Thermal Analyzer Model 990-3 with cell model HCBl-S/N00523, baseline scope=5.0 in a nitrogen atmosphere with a 10° C./minute progress rate. A transition correlatable to a glass transition temperature (Tg) was found at 256° C.

Thermogravimetric Analysis (TGA) was performed on the above polymer using a Du Pont Thermogravimetric Analyzer Model 99-2 with cell model 951-5 in an air atmosphere at a 10° C./minute progress rate. A 10% weight loss was observed at 540° C. and a 50% weight loss was observed at 570° C.

Films of the polymer prepared above were cast from a 12.5% polymer solution (based on weight) in N-methylpyrrolidone onto a glass plate treated with Du Pont TEFLON ® dry lubricant at 95° C.±2° C. with a 15-mil (38.4×10-5 m) knife gap. After drying on the plate at 95° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.1 mils (2.8×10-5 m) thick, was tested for mixed gas oxygen/nitrogen (21/79, mole) permeabilities at 482.5 psig (3327 kPag), 24.6° C. The results are reported below:

| $O_2$ Productivity: | 190 centiBarrers |
|---|---|
| $O_2N_2$ Selectivity: | 5.6 |

Example 5

To a stirred solution of 2,7-bis(4-aminophenoxy)-naphthalene,

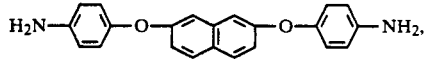

(25.00 g, 0.073 mol) in N-methylpyrrolidone (200 ml) was added 5,5'-[2,2,2-trifluoro-1-(trifluoromethyl)ethylidene]-bis-1,3-isobenzofurandione (32.78 g 0.74 mol) under an inert atmosphere at room temperature. The very viscous golden-brown reaction solution was stirred overnight at room temperature. A solution of acetic anhydride (29.85 g, 0.29 mol) and triethylamine (29.58 g, 0.29 mol) was added with rapid stirring at room temperature. After stirring for 2 hours at room temperature, the very viscous reaction solution was diluted with additional N-methylpyrrolidone and precipitated in water. The resulting solid was collected and washed three times with water, washed twice with methanol and allowed to air dry overnight. The solid was further dried in a vacuum oven at 20 inches (0.51 m) mercury and 120° C. for 4 hours and at 250° C. for 4 hours.

The polymer prepared above was found to be soluble in dichloromethane, dimethylsulfoxide, meta-cresol, N,N-dimethylacetamide, and N-methylpyrrolidone.

Films of the polymer prepared above were cast from a 15% polymer solution (based on weight) in N-methylpyrrolidone onto a glass plate treated with Du Pont TEFLON ® dry lubricant at 100° C.±2° C. with a 15-mil (38.4×10-5 m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and be creased without cracking.

A film, prepared as above which was 1.30 mils (3.30×10-5 m) thick, was tested for mixed gas oxygen/nitrogen (21/79, mole) permeabilities at 485.8. psig (3350 kPag), 22.1° C. The results are reported below:

| $O_2$ Productivity: | 150 centiBarrers |
|---|---|
| $O_2N_2$ Selectivity: | 5.5 |

A film, prepared as above which was 1.30 mils (3.30×10-5 m) thick, was tested for mixed gas oxygen/nitrogen (21.79, mole) permeabilities at 491.2 psig (3387 kPag), 22.8° C. The results are reported below.

| $O_2$ Productivity: | 150 centiBarrers |
|---|---|
| $O_2/N_2$ Selectivity: | 5.5 |

I claim:

1. A process for separating one or more gases from a gaseous mixture consisting essentially of bringing said gaseous mixture into contact with one side of a gas separation membrane whereby one or more of the gases permeates said membrane preferentially, said membrane being formed from an aromatic polyimide containing repreating units of the formula:

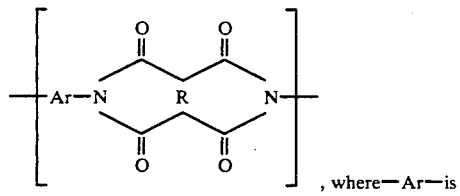

, where—Ar—is

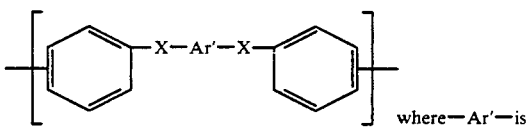

where—Ar'—is

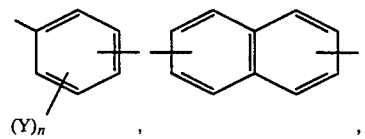

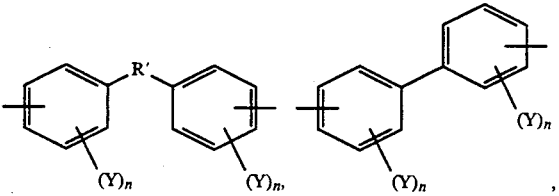

or mixtures thereof,

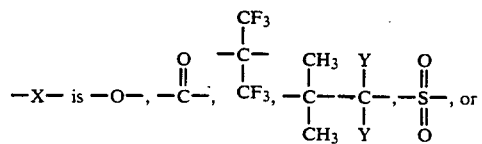

mixtures thereof,

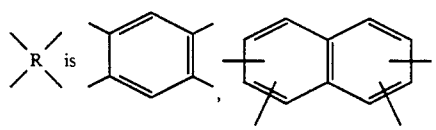, 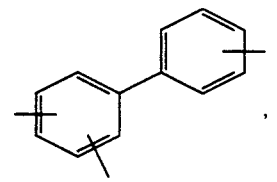

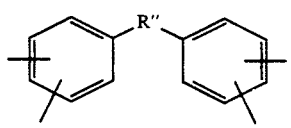

or mixtures thereof, —Y is independently —H, alkyl groups having 1 to 6 carbon atoms, aromatic groups having 6 to 12 carbon atoms, or a halogen provided that at least one Y cannot be —H, where n is an integer from 1 to 4 and —R'— is

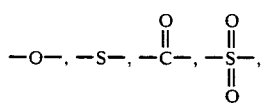

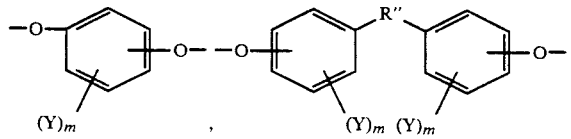

where R'' is

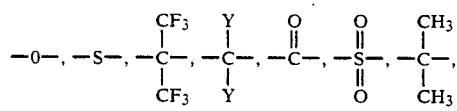

or 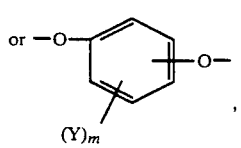

or mixtures thereof, where m is an integer from 0–4, said aromatic polyimide being of a film forming molecular weight.

2. The process of claim 1 wherein —x— is —o— or

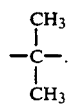

3. The process of claim 2 wherein 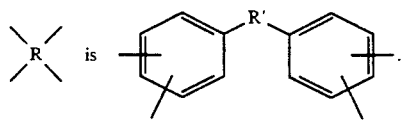

4. The process of claim 3 wherein —Ar'— is

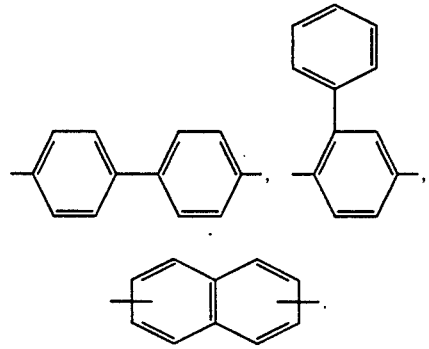

5. The process of claim 4 wherein —R'— is $$\begin{matrix} & CF_3 \\ -&C- \\ & CF_3 \end{matrix}$$

6. The process of claim 5 wherein —x— is —o—.

7. A gas separation membrane for preferentially separating one or more gases from a gaseous mixture formed from an aromatic polyimide consisting essentially of repeating units of the formula:

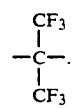, where —Ar— is

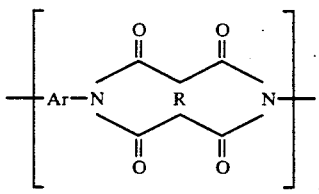

where —Ar'—is

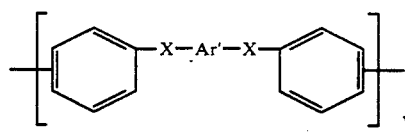

or mixtures thereof,

-continued

—X— is —O—, 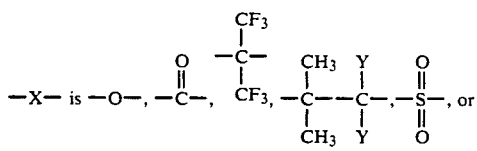
mixtures thereof,

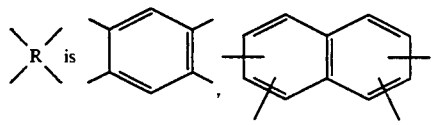 R is 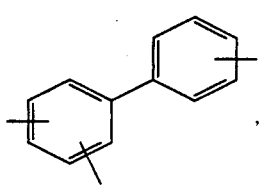,

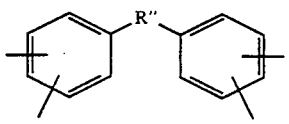

or mixtures thereof, —Y is independently —H, alkyl groups having 1 to 6 carbon atoms, aromatic groups having 6 to 12 carbon atoms, or halogen, provided that at least one —Y cannot be —H, where n is an integer from 1 to 4 and —R'— is

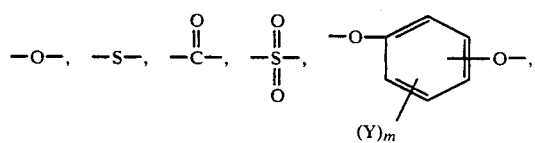

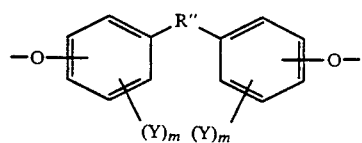

where R" is 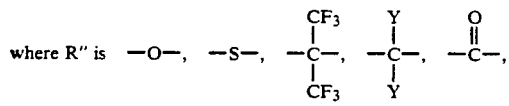

-continued

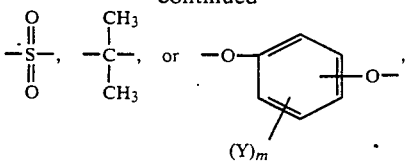

or mixtures thereof, where m is an integer from 0–4, said aromatic polyimide being of a film forming molecular weight.

8. The aromatic polyimide gas separation membrane of claim 7 wherein —x— is —O— or

9. The aromatic polyimide gas separation membrane of claim 8 wherein

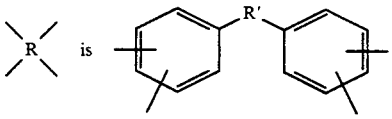

10. The aromatic polyimide gas separation membrane of claim 9 wherein —Ar'— is

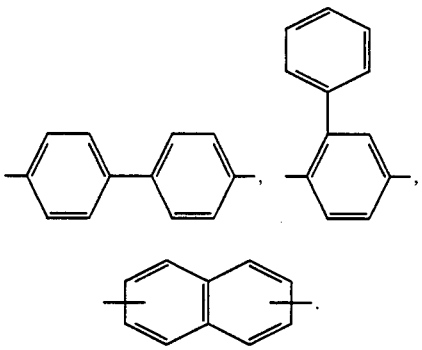

11. The aromatic polyimide gas separation membrane of claim 10 wherein —R'— is

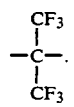

12. The aromatic polyimide gas separation membrane of claim 11 wherein —x— is —O—.

* * * * *